Oct. 7, 1952 A. O. WILSON 2,612,878
ROTARY INTERNAL-COMBUSTION ENGINE
Filed Sept. 14, 1948 3 Sheets-Sheet 3
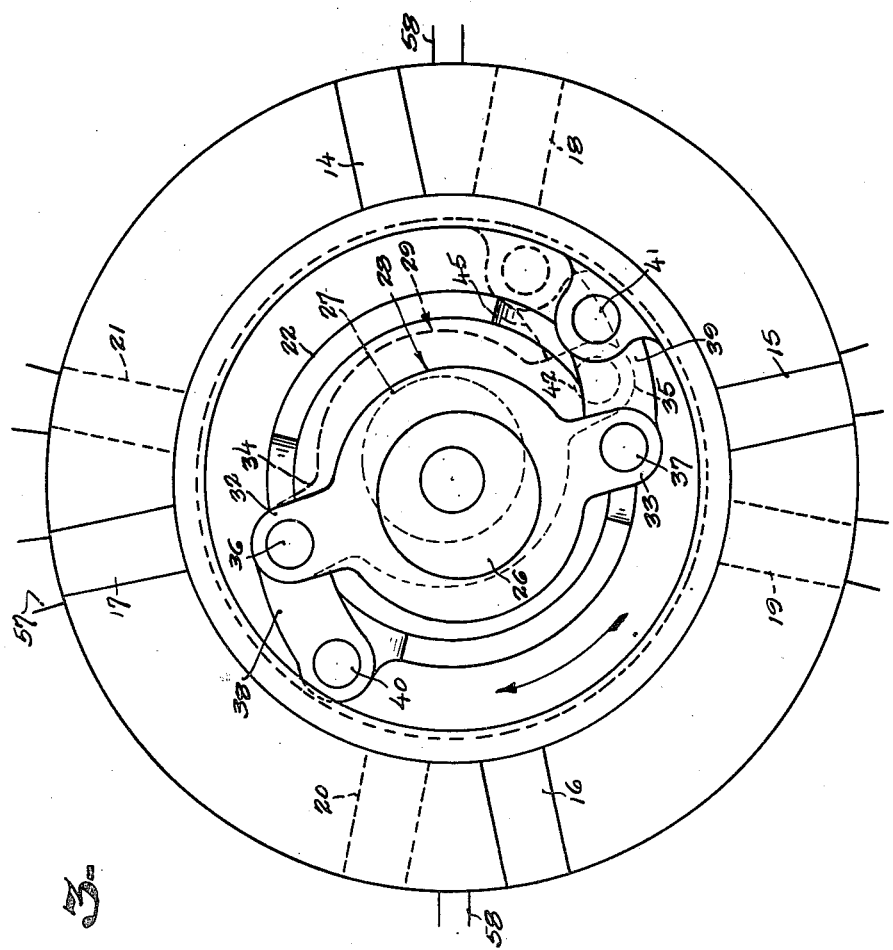
ARTHUR O. WILSON
INVENTOR.
BY
ATTORNEY Patented Oct. 7, 1952

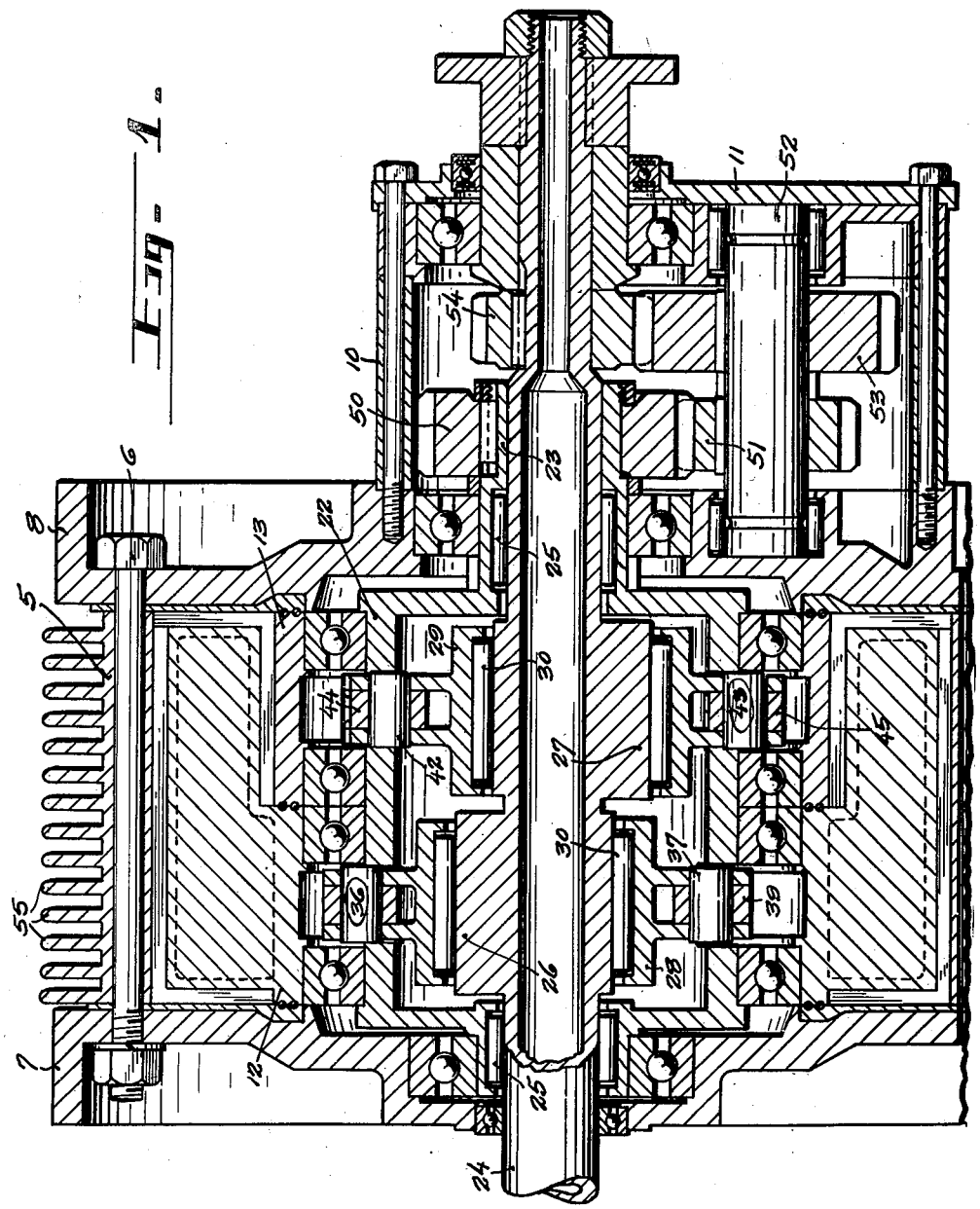

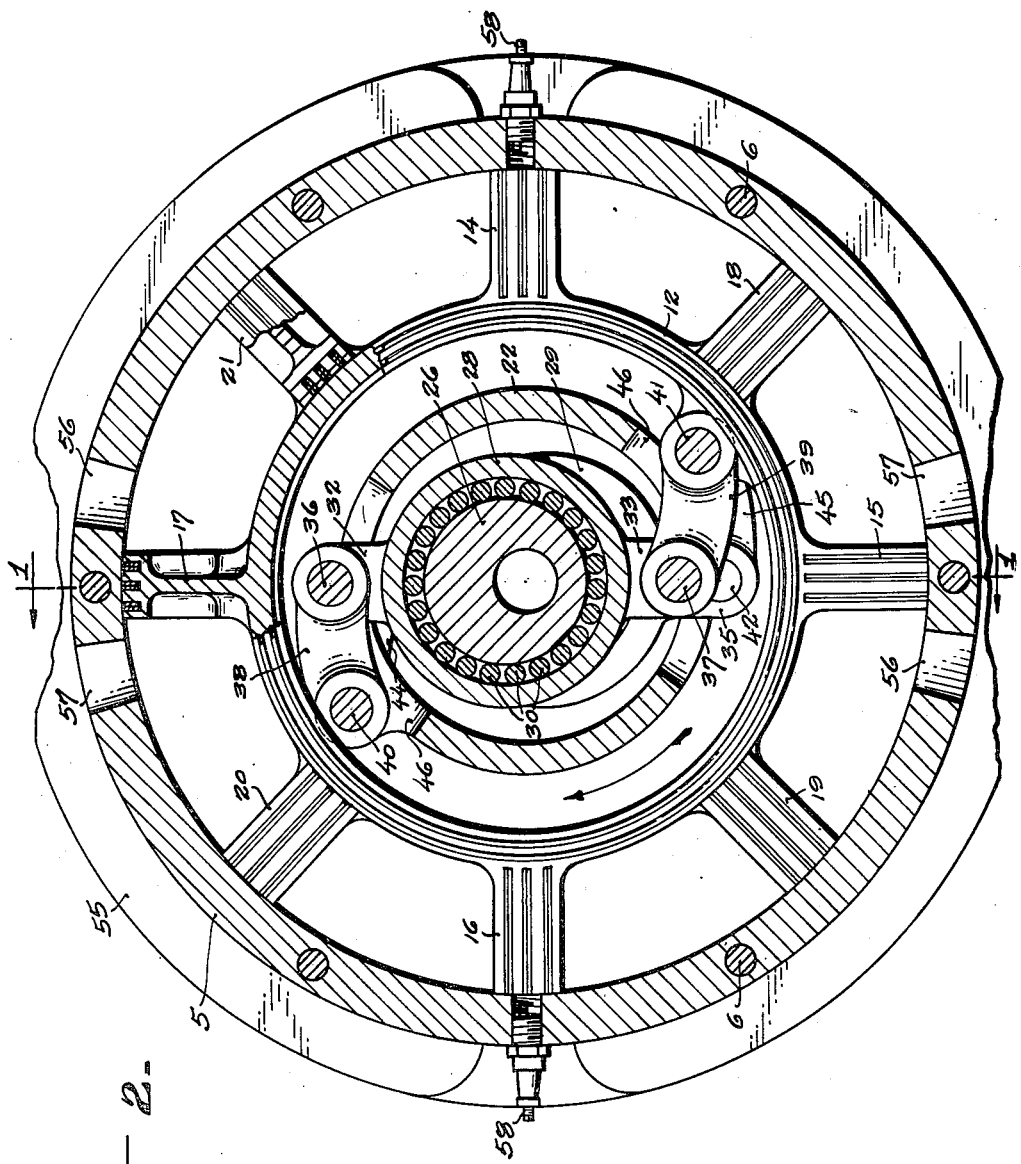

2,612,878

UNITED STATES PATENT OFFICE 2,612,878

ROTARY INTERNAL-COMBUSTION ENGINE

Arthur O. Wilson, Okanogan, Wash., assignor of one-half to John Dwight Fisk, Seattle, Wash.

Application September 14, 1948, Serial No. 49,200

9 Claims. (Cl. 123—11)

This invention relates to rotary internal combustion engines, and especially that type of a rotary internal combustion engine providing an annular cylinder and having multiple pistons fitted for orbital travel within the cylinder, the engine, in more particularity, being of that nature in which multiple pistons are given relative governed movement in course of their orbital progress and by such movement repetitively increase and diminish the volumetric capacity of pockets described between pairs of adjacent pistons; these pockets functioning as combustion chambers for the engine and by their cyclic change in volumetric capacity establishing conditions for (1) the intake of a charge of combustible fuel, (2) compression of the charge, (3) firing of the charge, and (4) exhausting of the spent gases. In its broad aspects, the present invention is of much the same character as that illustrated and described in U. S. Letters Patent No. 1,568,052, issued January 5, 1926, to F. A. Bullington.

The present invention has for its object the provision of a perfected engine of this nature, and especially one embodying a novel system of eccentrics for controlling the movements of the pistons to cause each said piston to act in complement both with a preceding and with a following piston and work with the latter in a necessary regulated sequence of cyclic motion.

With this and other more particular objects and advantages in view, and which will appear and be understood in the following description and claims, the invention consists in the novel construction and in the adaptation and combination of parts hereinafter described and claimed.

In the accompanying drawings:

Figure 1 is a longitudinal vertical sectional view illustrating an engine constructed in accordance with the preferred embodiment of the present invention, the engine here shown being one which employs two sets of four pistons. The section is taken on line 1—1 of Fig. 2 and the portrayed pistons are shown partly in section and partly in elevation.

Fig. 2 is a transverse vertical section thereof; and

Fig. 3 is a diagrammatic sectional view indicating the pistons in a stage of their movement somewhat prior to the positions in which the same are shown in Fig. 2.

Referring to said drawings, the engine case is formed to present two axially spaced compartments one of which functions as a gear chamber and the other of which may be considered as the working chamber. The working chamber is produced by a cylindrical casing member designated by the numeral 5 and secured, as by the bolts 6, between headers 7 and 8, and the gear chamber is produced by a shell 10 which is or may be oblong in end elevation and which is boltably or otherwise rigidly secured between the header 8 and an end plate 11.

Received within the working chamber in substantial end-to-end abutting relation are two rotary wheels 12 and 13 of less diameter than the bore of the casing member 5, and a set of pistons are integrated with each of these wheels and extend radially therefrom to the circumferential surface of the bore. I have indicated each said set as comprising four pistons denoted by 14, 15, 16 and 17 in the instance of the wheel 12 and by 18, 19, 20 and 21 in the instance of the wheel 13. The pistons, which are spaced at equidistant intervals of the related wheel's circumference and carry packing strips which fit into edge grooves, are each so designed, inclusive of the packing strips, as to extend the entire width of the working chamber.

Internally of the wheels and journal-mounted from the engine case to locate the same concentric to the wheels is a hollow drum-like cylinder 22 which extends by an end prolongation 23 into the gear chamber. This hollow cylinder finds indirect connection with the piston-wheels through the instrumentality of eccentrically mounted sheaves and complementing links hereinafter to be described, consequently serving the function of a carrier, and it is by this term that the same will be hereinafter referred to.

Designated by 24 is a main shaft. Said shaft receives a rotary journal from needle bearings 25 caged in terminal hubs of the carrier and projects by its ends beyond the latter, and integrated with the shaft and placed to occupy positions within the working chamber are a pair of axially spaced eccentrics 26 and 27. The hereinbefore mentioned sheaves, denoted 28 and 29, are journaled upon the eccentrics by suitable means such as the indicated needle bearings 30, and each sheave is provided with surface lugs, as 32—33 and 34—35, placed diametrically opposite one another. The surface lugs of the sheave 28 connect by wrist pins 36 and 37 with respective links 38 and 39, and these links extend in opposite directions circumferentially of the related sheave and connect through wrist pins 40 and 41 one with a lug fast to the carrier and the other with a lug fast to the piston wheel 12. Similarly, the two surface lugs 34 and 35 of the sheave 29 connect by wrist pins 42 and 43, respectively, with links 44 and 45, and these two links likewise connect by wrist pins one with the carrier and the other with the piston wheel 13. It will thus be seen that each of the two links 38 and 44 connect with the carrier, and that the two links 39 and 45 connect one with the piston wheel 12 and the other with the piston wheel 13. In order to accommodate the lugs and the links the carrier is cut away at spaced intervals of its length and at diametrically opposite sides to present circumferentially extending slots designated by 46.

Reverting now to the gear chamber, it will be seen that geared connection is provided between the main shaft 24 and the carrier 22, thus causing these two members to rotate at a constant ratio, with the shaft turning at the higher speed. The ratio which I provide is 5 to 1. The train of gears illustrated comprises a drive gear 50 keyed to the end prolongation 23 of the carrier and caused to mesh a step-up pinion 51 which operates through a stub shaft 52 to drive a gear 53 which meshes in turn with a step-up pinion 54 keyed to the main shaft 24. The nature of the gear train is unimportant to the present invention and planetary gearing or, in fact, any reduction drive suitable to the purpose might as well be employed.

The engine is portrayed as being air-cooled and fins 55 for this purpose extend circumferentially about the perimeter of the cylindrical casing member 5. The engine has its intake and exhaust ports, designated 56 and 57, respectively, and its spark plugs 58 each located within the circumference of said casing. Two said intake ports, two exhaust ports, and two plugs placed in each instance diametrically opposite one another are provided, and while not shown in the drawings the respective ports perforce connect with the usual intake and exhaust pipes, and the plugs are necessarily wired in an ignition circuit. The desired relationship, as between the ports and the plugs, and considered relative to the directional rotation of the piston wheels, positions an intake port in close following relation to an exhaust port and located an ignition plug substantially central to median lines taken through the intake and exhaust ports which occur upon one side and those which occur at the diametrically opposite side of the casing.

Describing the operation of the engine, it will be apparent that the main shaft, turning through five revolutions to each revolution of the carrier, transmits through its eccentrics an oscillatory movement to each of the sheaves more or less at right angles to radial lines projected from the rotary axis of the shaft through the axis of the related wrist pin which anchors the connecting link 38 or 44, as the case may be, to the carrier 22. This movement of the eccentrics shifts one sheave in one direction from center coincident with a shift of the other sheave in an opposite direction, and acting through the links 39 and 45 causes the two rotating piston wheels to move relatively, thus responsively moving the pistons of the one said wheel directively toward and from the pistons of the other wheel, reciprocally. During this operation, the carrier moves forward at a constant speed, advancing all the pistons as alternate oscillations take place. As each piston successively approaches and passes an intake port, an ignition port, and an exhaust port, it acts both with a preceding piston and with a following piston to produce pockets of continually changing dimensions into which the fuel gases are first drawn, then compressed, fired, and exhausted, the firing of the charges acting by the expansion of the burning gases to develop pressure upon both the front and back pistons of the pocket in question and, relatively speaking, causing the same to move directively from one another. Inasmuch, however, as the carriage is advancing at much the same speed as the rear piston is moving backwardly, the rear piston momentarily becomes stationary but actually transmits rotational power to the eccentric shaft. It is to be noted, and the 5 to 1 ratio is the controlling factor therefor, that whereas the combustion chambers described between two sets of pistons, say the pistons 14—18 and 16—20, will be brought into positions preparatory to being fired from the right-hand and left-hand ignition plugs, respectively, when the multiple pistons and their connecting elements are located as shown in Fig. 3, a half turn of the eccentric shaft 24 or 191¼° in relation to the carrier will perforce relocate these pistons such as, position considered, substantially to transpose the leading piston of the one set with the following piston of another set and the compressed charges which are ready to be fired will be then contained between pistons 14 and 21 as one set and between pistons 16 and 19 as the other set, the trailing pistons 14 and 16 coincidently acting as leading pistons in back of which pistons 21 and 19 become trailing pistons to compress charges and being themselves advanced to a point where firing will take place only as the carrier has advanced a further 45° of rotary travel.

It is to be noted that the drive from the engine can be taken off either the main shaft 24 or a prolongation of the stub shaft 52, both of which are geared together, to accomplish either a high-speed or a low-speed drive, comparatively speaking.

It is thought that the present engine and the manner of its operation will be clear from the foregoing detailed description of my now-preferred embodiment. The engine obviously admits of some changes in its details of construction without departing from the spirit of the invention, and it is my intention that the hereto annexed claims be read with the broadest interpretation which the employed language fairly permits.

What I claim is:

1. In a rotary internal combustion engine, an engine case providing an annular working chamber, a main shaft journal-mounted in the case for rotary movement about an axis concentric thereto and formed to provide a pair of eccentrics occupying axially spaced positions within the working chamber, a pair of piston wheels each carrying a set of radial pistons and journal-mounted for rotary movement about an axis coinciding with that of the shaft, a carrier also received in the working chamber and likewise journal-mounted for rotary movement about the center of the shaft as an axis, sheaves working on the eccentrics, means connecting both sheaves to the rotary carrier and each sheave to a respective one of the two piston wheels for imparting relative rotary motion to the two sets of pistons in response to a rotary movement of the main shaft at a speed differing from that of the carrier, and connection between said shaft and the carrier for causing the one to turn at a different speed than the other.

2. In a rotary internal combustion engine, an engine case providing an annular working chamber, a main shaft journal-mounted in the case for rotary movement about an axis concentric thereto and formed to provide a pair of eccentrics occupying axially spaced positions within the working chamber and placed with their high points at diametrically opposite sides of the shaft, a pair of piston wheels each carrying a set of radial pistons and journal-mounted side by side for rotary movement about an axis coinciding with that of the shaft, a carrier also received in the working chamber and likewise journal-mounted for rotary movement about the center of the shaft as an axis, sheaves working on the eccentrics, link means connecting both sheaves to the rotary carrier and each sheave to a respective one of the two piston wheels for imparting relative rotary motion to the two sets of pistons in response to a rotary movement of the main shaft at a speed differing from that of the carrier, and connection between said shaft and the carrier for causing the one to turn at a different speed than the other.

3. In a rotary internal combustion engine, an annular working chamber, a main shaft journaled for rotation about the center of the chamber as an axis and formed to provide a pair of eccentrics placed with their high points at diametrically opposite sides of the shaft and occupying axially spaced positions within the chamber, two piston wheels and a carrier wheel, the latter of smaller diameter than the piston wheels, each received in the chamber and journal-mounted for rotation about a common axis coinciding with that of the shaft, the two piston wheels having a corresponding diameter less than that of the working chamber and being placed side-by-side to each extend substantially one-half the length of the working chamber, sets of pistons integrated with the piston wheels and extending radially outwardly therefrom with the pistons of one set alternating with the pistons of the other set and with each said piston wiping the inner periphery and both end walls of the working chamber to define individual fuel pockets between adjacent pistons, means connecting the main shaft to the carrier wheel and acting by rotation of the former to drive the latter at a lower R. P. M., sheaves working on the two eccentrics, and connections from both sheaves to the carrier wheel and from each sheave to a respective one of the two piston wheels operating by the different speeds at which said carrier wheel and the shaft turn to alternatively establish interrupted orbital travel of the two piston wheels responsively causing the several pistons of one set to move toward and from adjacent pistons of the other set.

4. In a rotary internal combustion engine, an annular working chamber, a main shaft journal-mounted for rotation about the center of the chamber as an axis and formed to provide a pair of eccentrics placed with their high points at diametrically opposite sides of the shaft and occupying axially spaced positions within the chamber, two piston wheels and a carrier wheel each received in the chamber and journal-mounted for rotation about a common axis coinciding with that of the shaft, sets of radial pistons integrated with each of the piston wheels and each piston of one set acting with adjacent pistons of the other set to provide fuel pockets, sheaves working on the eccentrics, means connecting the carrier wheel to the main shaft acting by rotation of the former to drive the latter at a higher R. P. M., and link connections from both sheaves to the carrier wheel and from each sheave to a respective one of the two piston wheels operating by the different speeds at which said carrier wheel and the shaft turn to alternatively establish interrupted orbital travel of the two piston wheels to responsively cause the several pistons of one set to move toward and from adjacent pistons of the other set.

5. In a rotary internal combustion engine, an annular working chamber, a main shaft journaled for rotation about the center of the chamber as an axis and formed to provide a pair of eccentrics occupying axially spaced positions within the chamber and disposed with their high points diametrically opposite one another, two piston wheels and a carrier wheel each received in the chamber and journal-mounted for rotation about a common axis coinciding with that of the shaft, the two piston wheels lying side-by-side and having a corresponding diameter less than that of the working chamber, the carrier wheel being of smaller diameter than the piston wheels, sets of radial pistons for each piston wheel each wiping the inner periphery and both end walls of the working chamber and made integral with the related piston wheels to occur at 90° intervals about the circumference of the latter with the pistons of one set alternating with the pistons of the other set, exhaust and intake ports lapped by the pistons in course of the rotary travel thereof and occurring in close following relation at diametrically opposite sides of the working chamber, sparking devices placed intermediate the two sets of ports, sheaves working on the eccentrics, means connecting the carrier wheel to the main shaft acting by rotation of the former to drive the latter at a higher R. P. M., and connections from both sheaves to the carrier wheel and from each sheave to a respective one of the two piston wheels operating by the different speeds at which said carrier wheel and the shaft turn to alternatively establish interrupted orbital travel of the two piston wheels to responsively cause the several pistons of one set to move toward and from adjacent pistons of the other set.

6. The rotary internal combustion engine of claim 5, the speed ratio as between the main shaft and the carrier being 5 to 1.

7. In a rotary internal combustion engine, an annular working chamber, a main shaft journaled for rotation about the center of the chamber as an axis and formed to provide a pair of eccentrics occupying axially spaced positions within the chamber and disposed with their high points diametrically opposite one another, two piston wheels and a carrier wheel each received in the chamber and journal-mounted for rotation about a common axis coinciding with that of the shaft, the two piston wheels lying side-by-side and having a corresponding diameter less than that of the working chamber, the carrier wheel being of smaller diameter than the piston wheels, sets of radial pistons for each piston wheel each wiping the inner periphery and both end walls of the working chamber and made integral with the related piston wheels to occur at 90° intervals about the circumference of the latter with the pistons of one set alternating with the pistons of the other set, exhaust and intake ports lapped by the pistons in course of the rotary travel thereof and occurring in close following relation at diametrically opposite sides of the working chamber, sparking devices placed intermediate the two sets of ports, sheaves working on the eccentrics, a respective rod for each of said sheaves linking the related sheave to the carrier wheel, and a respective rod for each of said sheaves one linking one sheave to one piston wheel and the other linking the other sheave to the other piston wheel arranged and adapted, by the different speeds at which said carrier wheel and the shaft turn, to alternatively establish such interrupted orbital travel of the two piston wheels as will responsively cause the several pistons of the one set to move toward and from adjacent pistons of the other set, the fuel pockets which are described between adjacent pistons acting to develop their maximum compression pressure at a point coinciding with the passage of said fuel pockets by the sparking devices.

8. In a rotary internal combustion engine, an engine case providing an annular working chamber, a main shaft journal-mounted in the case for rotary movement about an axis concentric thereto and formed to provide a pair of eccentrics occupying axially spaced positions within the working chamber and having their high points at diametrically opposite sides of the shaft, sheaves working on the eccentrics, a carrier received in the working chamber and journal-mounted for rotary movement about the center of the shaft as an axis, a pair of piston wheels each carrying a set of radial pistons and journal-mounted side-by-side on the carrier, said piston wheels having a combined width sufficient to bridge the working chamber and hence isolate an annular combustion chamber interrupted by the radial pistons, means connecting both sheaves to the rotary carrier and each sheave to a respective one of the two piston wheels for imparting relative rotary motion to the two sets of pistons in response to a rotary movement of the main shaft at a speed differing from that of the carrier, and connections between said shaft and the carrier for causing the one to turn at a different speed than the other.

9. The engine of claim 8 wherein seals are provided between the piston wheels, between such wheels and the end walls of the working chamber, and between the pistons and the walls of the combustion chamber.

ARTHUR O. WILSON.

REFERENCES CITED

The following references are of record in the file of this patent:

UNITED STATES PATENTS

| Number | Name | Date |
|---|---|---|
| 1,476,784 | Weed | Dec. 11, 1923 |
| 1,568,053 | Bullington | Jan. 5, 1926 |
| 1,701,534 | Knopp | Feb. 12, 1929 |
| 2,450,150 | McCulloch et al. | Sept. 28, 1948 |

FOREIGN PATENTS

| Number | Country | Date |
|---|---|---|
| 3,138 | Great Britain | Sept. 26, 1873 |
| 396,253 | Great Britain | Aug. 3, 1933 |
| 612,081 | Germany | Apr. 13, 1935 |